UNITED STATES PATENT OFFICE.

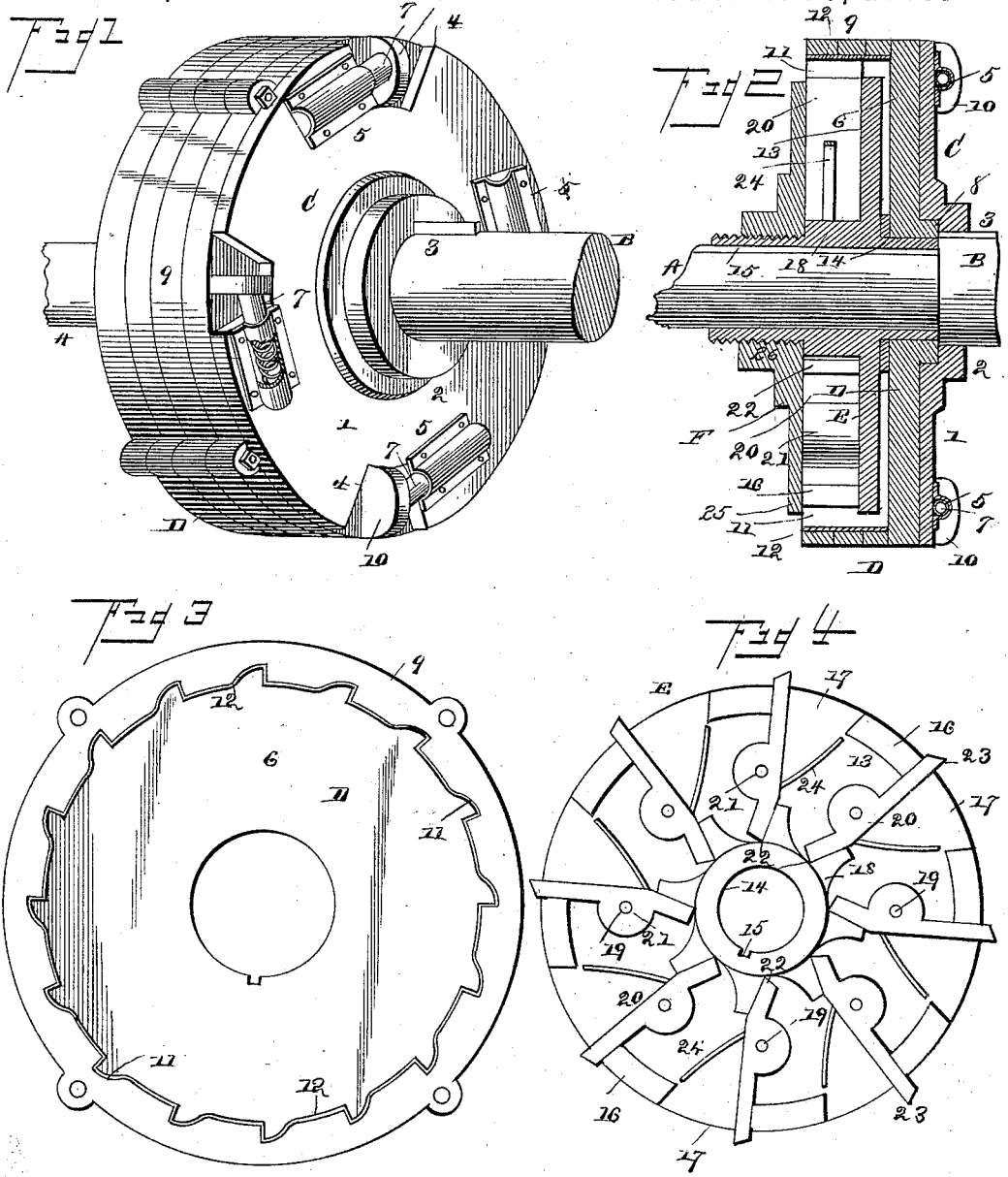

LEWIN RACINE, OF HILLSDALE, MICHIGAN.

SHAFT COUPLING OR CLUTCH.

SPECIFICATION forming part of Letters Patent No. 415,653, dated November 19, 1889.

Application filed May 9, 1889. Serial No. 310,175. (No model.)

*To all whom it may concern:*

Be it known that I, LEWIN RACINE, a citizen of the United States, residing at Hillsdale, in the county of Hillsdale and State of Michigan, have invented a new and useful Shaft Coupling or Clutch, of which the following is a specification.

This invention has relation to shaft couplings or clutches, and among the objects in view are to provide an easily-manipulated and simple device for coupling the two ends of adjacent shafts, and this in a manner that will obviate any sudden wrenching or straining of the coupling or shafts.

The invention consists in certain features of construction hereinafter specified, and more particularly pointed out in the claims.

Referring to the drawings, Figure 1 represents a perspective of two shafts coupled by a coupling constructed in accordance with my invention. Fig. 2 is a central vertical longitudinal section of the shafts; and Figs. 3 and 4 are details in plan of two of the sections, hereinafter more particularly referred to.

Like numerals and letters of reference indicate like parts in all the figures.

A and B represent two ordinary shafts, the ends of which are arranged adjacent to each other and the shafts being in line.

The coupling consists, essentially, of three sections C, D, and E. The section C consists of a circular disk 1, having a central hub portion 2, flanged to bear upon the shaft A and splined thereto, as at 3, and thus adapted for longitudinal movement upon the shaft. The outer edge or perimeter of the disk 1 is recessed at intervals, as at 4, and upon one of the edges of each of the recesses there is mounted in keepers 5 spring-pressed bolts 7, the free ends of which by reason of the springs are normally projected into their respective recesses. The section D consists of a disk 6, having a hub portion 8 and an annular flange 9. If desired, and in order to facilitate the manufacture of this section D, the same may be formed in three or four segmental sections bolted together. Upon the rear face of the section D are mounted lugs 10, which project laterally from the face and are a distance from their hub and otherwise relatively located, so as to register with and be inserted in the recesses 4 of the section C. The inner face of the annular flange 9 is provided with a series of recesses 11, extending transverse the flange. These recesses may, if desired, and in case the section C be cast, be provided with a lining 12, conforming to the shape of the interior of the annular flange.

E represents the pawl disk or section, and it consists of the disk portion 13, having a hub 14, projecting at both sides thereof and splined, as at 15, for reciprocation upon the shaft B. Upon the rear portion of the hub 14 is mounted the section D, the annular flange of said section receiving the disk 13 and its adjuncts, as will hereinafter appear. The disk 13 upon its front face is provided with an annular flange 16, recessed at intervals to form spaces 17, and the hub 14 at its juncture with the disk 13 is provided with radially-disposed teeth or ratchets 18. Said teeth or ratchets are arranged approximately in radial alignment with the recesses 17, formed in the flange 16. Intermediate the flange 16 and each of the spaces between the teeth 18 are mounted upwardly-projecting pins 19, and upon each of said pins is mounted a pawl 20. The pawl 20 is provided with a transversely-perforated boss 21, adapted for receiving the pin 19, and with oppositely-disposed inclined teeth 22 and 23, the first-mentioned being designed to operate loosely between the teeth of the ratchet 18 and the last-mentioned being chamfered at its edge and adapted for oscillation between the standing portions of the flange 16, or what might be termed more properly the "recesses" 17. The relative size of the pawls 20 is such, when considered in relation to the disk 13, that when said pawls are swung upon their pivots, so as to radiate from the center of said disk, the outer ends thereof will project beyond the periphery of the disk and into the notches 11 of the flange 9 of the section C. Upon the front faces of each of the pawls 20 and at their upper inclined portion 22 there projects outwardly a flat spring 24.

The section F consists merely of an annular disk 25, having a hub 26, adapted to receive the hub 14 of the section E, and said hub 26 is provided upon its outer surface with a nut or wrench surface and may be interiorly screw-threaded to engage with similar threads upon the periphery of the hub 14, whereby said disk or section F acts merely to retain the pawls in position.

The operation of my invention will be readily apparent from the foregoing description, but may be briefly stated as follows: To couple the shafts, the two sections C and D, mounted upon the shafts A and B, respectively, are interlocked and the lugs 10 of the section D take within the recesses 4 of the section C and against the tension of the bolts 7, which bolts serve to retain the sections in working contact. Strain is now imparted from the shaft A through its disk or section C, and yieldingly to the section D, which in turn revolves, and in so doing the edges or corners of the notches 11 catch one of the outwardly-extending corners of each of the pawls 20, and in this manner said pawls are drawn out, so as to take into an adjacent notch. The pawls are thus swung on their pivots and their rear inclined face takes against the rear face of one of the teeth of the ratchet 18, and from this motion is imparted to the hub 14, and thence to the shaft B. From this it will be seen that the connection though rigid when formed, yet is formed in such a yielding and gradual manner that the coupling and shafts are free from any inordinate or undue strain. When the shafts are uncoupled, the springs 24, the free ends of each of which bear against the perforated boss 21 of the next adjacent pawls serve to throw the pawls back in their normal position and out of contact or mesh with the grooves in the flange 9 of the section C.

Having described my invention, what I claim is—

1. The combination, with two adjacent shafts, of a coupling comprising three sections, the first section being splined to one shaft and provided with peripheral recesses and the second section being mounted upon the opposite shaft and provided with rearwardly-extending lugs adapted for connection with the first section within the recesses of the same and provided with an annular flange recessed upon its inner face, and a third section mounted on the shaft and having opposite hubs, upon one of which the second-mentioned section is mounted, and provided with a series of pawls adapted to be projected beyond their support and to mesh with the teeth of the second section, substantially as specified.

2. The combination, with the section C, having the hub 2 and disk 1, recessed, as at 4, and having spring-bolts 7, of the section E, having the disk portion 13, provided with the opposite hub portions 14, said disk having a lateral flange 16, recessed, as at 17, and a toothed ratchet 18, and intermediate pivoted pawls the rear ends of which operate in said ratchet and the front ends of which operate in the recesses 17, and the clamping plate or section F, mounted on the front portion of the hub 14, and section D, consisting of the hub portion 8, mounted on the rear end of the hub 14 and having the disk 6, and the annular flange 9, notched, as at 11, and adapted to receive the pawls 20, substantially as specified.

3. The combination, with the disk 6, having the boss or hub portion 8 and the flange 9, recessed, as at 11, of the section E, having the hub portion 14 to receive the boss 8 and provided with the ratchet 18 and flange 16, recessed, as at 17, and having the series of pins 19, carrying the pawls 20, each provided with a perforated boss 21, and the faces 22 and 23, and having the springs 24, and the clamping plate or disk 25, substantially as specified.

4. A coupling for two adjacent shafts, comprising three sections C D E, the section C being held from movement on one shaft and provided with peripheral recesses 4 and spring-pressed bolts 7, the section D having lugs 10, which pass through recesses 4 of section C and are engaged by the bolts 7, and the section E held rigid to the other shaft and provided with spring-pressed pawls engaging the section D, as set forth.

5. A coupling for shafts, comprising the sections C D E, the section C being held rigid on one shaft and provided with spring-pressed bolts 7, the section D having lugs 10 to be engaged by the bolts 7, and the section E to be received within the section D and having spring-pressed pawls to engage the section D, as set forth.

6. A coupling comprising sections C D E F, the section C being held rigid on one shaft and the other sections E F held rigid on the other shaft, and section D being movably mounted on section E, the spring-pressed bolts 7 on section C, engaging the section D, and the section E being received within section D and having spring-pressed pawls engaging with said section D, and the section F covering the pawls of section E, as set forth.

In testimony that I claim the foregoing as my own I have hereto affixed my signature in presence of two witnesses.

LEWIN RACINE.

Witnesses:
CHAS. O. BELL,
E. B. BELL.